United States Patent
Vaikar

(10) Patent No.: US 9,171,024 B1
(45) Date of Patent: Oct. 27, 2015

(54) METHOD AND APPARATUS FOR FACILITATING APPLICATION RECOVERY USING CONFIGURATION INFORMATION

(75) Inventor: Amol Manohar Vaikar, Pune (IN)

(73) Assignee: Symantec Corporation, Mountain View, CA (US)

( * ) Notice: Subject to any disclaimer, the term of this patent is extended or adjusted under 35 U.S.C. 154(b) by 1239 days.

(21) Appl. No.: 12/415,489

(22) Filed: Mar. 31, 2009

(51) Int. Cl.
*G06F 17/30* (2006.01)
*G06F 11/20* (2006.01)

(52) U.S. Cl.
CPC ............ *G06F 17/303* (2013.01); *G06F 11/203* (2013.01)

(58) Field of Classification Search
CPC ....... G06F 17/303; G06F 15/177; G06F 8/00; G06F 8/70; G06F 8/71; G06F 9/45541; G06F 9/5055; G06F 11/203; G06F 12/0646
USPC .................. 713/1, 2, 100; 707/204, 645–686; 717/168–174
See application file for complete search history.

(56) References Cited

U.S. PATENT DOCUMENTS

| | | | |
|---|---|---|---|
| 7,680,957 B1* | 3/2010 | Ketterhagen et al. | 709/246 |
| 7,831,788 B1* | 11/2010 | Ohr et al. | 711/162 |
| 8,065,561 B1* | 11/2011 | Vaikar et al. | 714/15 |
| 8,387,038 B2* | 2/2013 | Wheeler et al. | 717/174 |
| 2003/0233379 A1* | 12/2003 | Cohen et al. | 707/200 |
| 2003/0233645 A1* | 12/2003 | Cohen et al. | 717/174 |
| 2007/0150488 A1* | 6/2007 | Barsness et al. | 707/100 |
| 2007/0220248 A1* | 9/2007 | Bittlingmayer et al. | 713/100 |
| 2008/0028402 A1* | 1/2008 | Senoo | 718/1 |
| 2009/0049438 A1* | 2/2009 | Draper et al. | 717/168 |

OTHER PUBLICATIONS

"RAID Configuration," ©2002-2009 Geekzone®, SohoSolutions. Downloaded from web site http://www.geekzone.co.nz/content.asp?contentid=6323 on Jun. 29, 2009.
"Storage Technology News: EMC buys Indigo Stone for bare-metal restore," by SearchStorage.com Editors, May 11, 2007—SearchStorage.com. Downloaded from web site http://searchstorage.techtarget.com/news/article/0,289142,sid5_gci1254636,00.html on Jun. 29, 2009.
"WebHosting TALK®—Colocation and Data Center Discussion—Backup Software," Sep. 2005. Downloaded from web site http://www.webhostingtalk.com/archive/index.php/t-439917.html on Jun. 29, 2009.
"Backup RAID 0 Configuration ?," TechSpot Open Boards, 2004-2005, Copyright © 1998-2009 TechSpot.com. Downloaded from web site http://www.techspot.com/vb/topic11428.html on Jun. 29, 2009.
"To restore an array configuration," Microsoft TechNet, ©2009 Microsoft Corporation. Downloaded from web site http://technet.microsoft.com/en-us/library/cc722711(printer).aspx on Jun. 29, 2009.

* cited by examiner

*Primary Examiner* — Fahmida Rahman
(74) *Attorney, Agent, or Firm* — Campbell Stephenson LLP

(57) ABSTRACT

A method and apparatus for facilitating application recovery using configuration information is described. In one embodiment, a method for facilitating application recovery using configuration information includes accessing information in memory associated with an application configuration that correlates with source computer hardware for operating an application using at least one processor, identifying at least one portion that is to be restored of the application configuration using the at least one processor and applying the at least one portion of the application configuration in the memory to destination computer hardware using the at least one processor.

22 Claims, 3 Drawing Sheets

METHOD AND APPARATUS FOR FACILITATING APPLICATION RECOVERY USING CONFIGURATION INFORMATION

BACKGROUND

1. Field of the Invention

Embodiments of the present invention generally relate to datacenter management systems and, more particularly, to a method and apparatus for facilitating application recovery using configuration information.

2. Description of the Related Art

In a typical computing environment (e.g., a datacenter), administrators and/or users desire highly available applications and quick recovery of host computers after a disaster (e.g., power failure, hurricane and/or the like). Various software programs (e.g., an application) as well as one or more hardware devices (e.g., a server, an array, a switch, a firewall and/or the like) are employed to provide data and application services to client computers.

Current disaster recovery systems (e.g., SYMANTEC Net-BackUp Bare Metal Recovery (NBU-BMR)) store a backup of the host computer (e.g., a physical machine or a virtual machine). When a hardware failure or software fault occurs that disables the host computer, these current disaster recovery systems provisions a bare metal server to restore operations at the host computer or another host computer. Generally, the bare metal server is a computer that does not contain an operating system or any software applications. The bare-metal server may be a computer in which a virtual machine is installed directly on computer hardware rather than within the host operating system (OS). The bare metal server provisioned with an appropriate operating system, application software, file data and a host computer configuration. Configurations associated with the various hardware devices and/or software programs are backed up regularly to facilitate restoration of one or more hardware and/or software programs during a failure.

Currently, various recovery techniques (i.e., Bare Metal Host Recovery (BMR) and/or the like) are employed, but such techniques are restricted to recovering an entire host computer but not an application that is running on the host computer. In addition, an application configuration simply includes configuration information that only the application may view and/or comprehend. For example, a database name and location, among other application specific parameters, are of significance from the application perspective but not from the file system, logical volume, LUN and/or a zone on which a storage device associated with the database is assigned.

Disaster recovery techniques for host computers are not flexible and are unable to assure a full application recovery in an efficient manner. For instance, the host may operate three instances of a database application and each instance uses different volumes to storage data. If such host is restored using current techniques, then the new host is configured with all three database instances, but the new host may not have a sufficient amount of storage resources to operate all three database instances. In other words, the current techniques are unable to recover an instance of an application. For example, restoration of only one of the three database instances and any associated volumes is impossible using the current techniques.

Therefore, there is a need in the art for a method and apparatus for facilitating application recovery in a datacenter using configuration information.

SUMMARY OF THE INVENTION

Embodiments of the present invention comprise a method and apparatus for facilitating application recovery using configuration information. In one embodiment, a method for facilitating application recovery using configuration information includes accessing information in memory associated with an application configuration that correlates with source computer hardware for operating an application using at least one processor, identifying at least one portion that is to be restored of the application configuration using the at least one processor and applying the at least one portion of the application configuration in the memory to destination computer hardware using the at least one processor.

In another embodiment, an apparatus for facilitating application recovery using configuration information includes a data protection component for accessing information in memory associated with an application configuration that correlates with source computer hardware that operates an application using at least one processor and applying at least one compatible configuration parameter associated with the application configuration of the source computer hardware to destination computer hardware using the at least one processor.

In yet another embodiment, a computer-readable-storage medium comprising one or more processor-executable instructions that, when executed by at least processor, causes the at least one processor to access information associated with an application configuration that correlates with source computer hardware for operating an application, identify at least one portion that is to be restored of the application configuration and apply the at least one portion of the application configuration to destination computer hardware.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
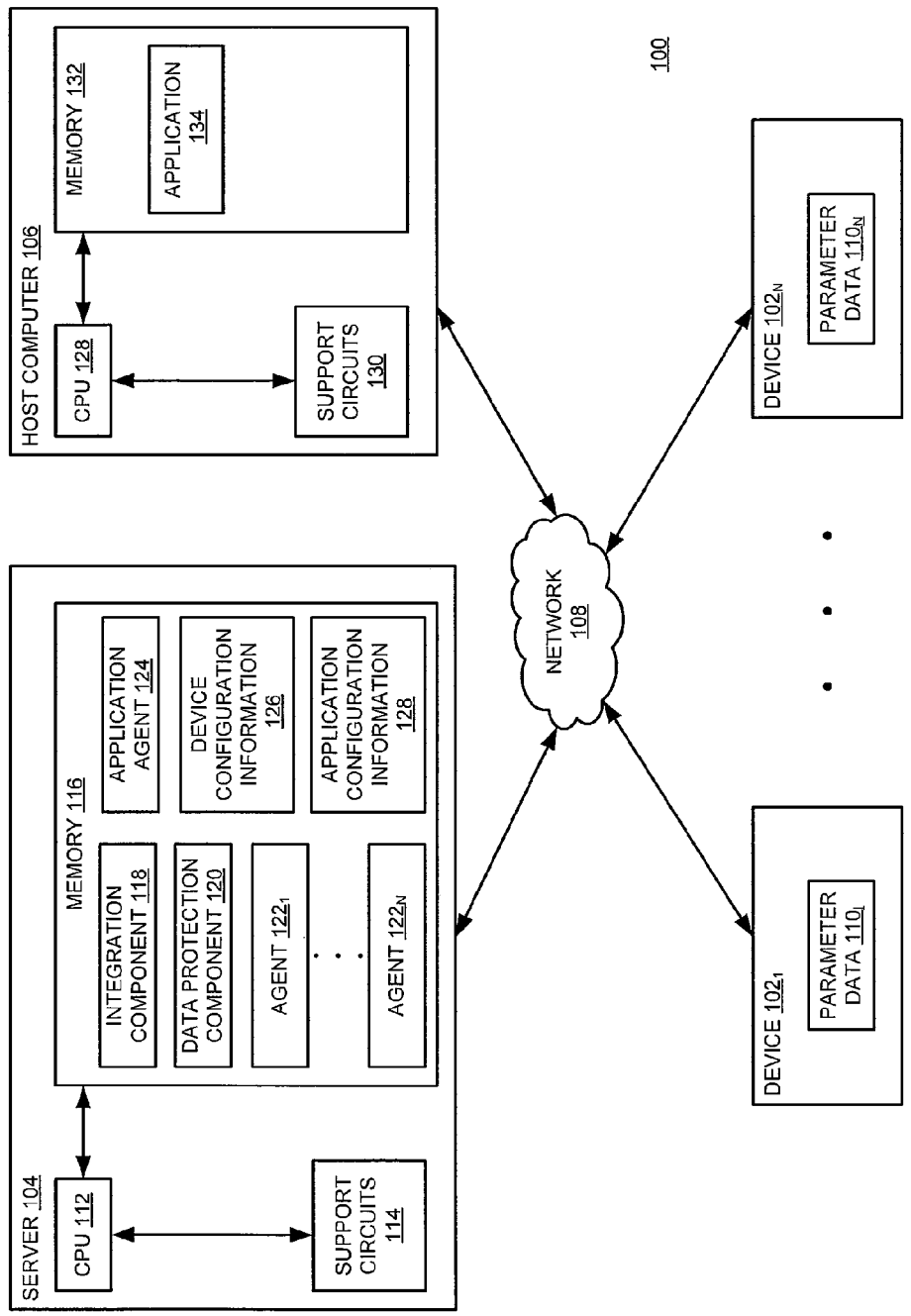
FIG. 1 is a block diagram of a system for facilitating application recovery using configuration information according to various embodiments of the present invention.

FIG. 1 is a block diagram of a system 100 for facilitating application recovery using configuration information according to one embodiment of the invention. The system 100 comprises a plurality of devices 102 (illustrated as a device $102_1$, a device $102_2$, a device $102_3$ ... a device $102_N$), a server 104 and a host computer 106 where each is coupled to one another through a network 108. As described further below, an application configuration that correlates with computer hardware components for operating an application includes various compatible configuration parameters that may be used to restore the application on a host computer, such as a bare metal server. The application configuration indicates relationships/dependencies between the application and the computer hardware components that are critical for operating the application.

The plurality of devices 102 are illustrated as a device $102_1$, a device $102_2$, a device $102_3$ ... a device $102_N$. Each device of the plurality of devices 102 is a type of a hardware device (e.g., including but not limited to an array, a switch, a router, a firewall and/or the like) known to one of ordinary skill in the art having the benefit of this disclosure. The plurality of devices 102 facilitates various computer operations within the system 100 (e.g., data storage, disaster recovery, application/file serving and/or the like).

Even though two or more devices of the plurality of the devices 102 may be provided by different venders, these devices may perform similar functions and utilize compatible configurations. For example, various configuration parameters (e.g., a LUN size, a number of disks, volume group IDs, an Internet Protocol (IP) address, a SCSI target address and/or the like) may be common to the two or more devices. As described further below, one or more compatible configuration parameters associated with source computer hardware of the plurality of devices 102 may be used to configure a target device of the plurality of devices 102 in order to perform device recovery. In addition, one or more compatible configuration parameters associated with an application running on the source computer hardware may be used to configure the destination computer hardware in order to achieve application recovery.

The host computer 106 is a type of computing device (e.g., a laptop, a desktop, a Personal Digital Assistant (PDA) and/or the like), such as those generally known in the art. The host computer 106 includes a Central Processing Unit (CPU) 128, various support circuits 130 and a memory 132. The CPU 128 may comprise one or more commercially available microprocessors or microcontrollers that facilitate data processing and storage. The various support circuits 130 facilitate the operation of the CPU 128 and include one or more clock circuits, power supplies, cache, input/output circuits, and the like. The memory 132 comprises at least one of Read Only Memory (ROM), Random Access Memory (RAM), disk drive storage, optical storage, removable storage and/or the like. The memory 132 includes various data, such as application 134.

The server 104 is a type of computing device (e.g., a laptop, a desktop, a Personal Digital Assistant (PDA) and/or the like), such as those generally known in the art. The server 104 includes a Central Processing Unit (CPU) 112, various support circuits 114 and a memory 116. The CPU 112 may comprise one or more commercially available microprocessors or microcontrollers that facilitate data processing and storage. The various support circuits 114 facilitate the operation of the CPU 112 and include one or more clock circuits, power supplies, cache, input/output circuits, and the like. The memory 116 comprises at least one of Read Only Memory (ROM), Random Access Memory (RAM), disk drive storage, optical storage, removable storage and/or the like. The memory 116 includes various software packages, such as a data protection component 120, an integration component 118, one or more plurality of agents 122 and an application agent 124.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet or Intranet using various communications infrastructure such as Ethernet, WiFi, WiMax, General Packet Radio Service (GPRS), and the like. Furthermore, the network 108 may form a portion of a Storage Network Area (SAN) using various communications infrastructure such as Ethernet, Fibre Channel, InfiniBand, Internet Small Computer System Interface (iSCSI) and/or the like.

The plurality of agents 122 may share various resources (e.g., data sources, application services, protocols, methods and/or the like) amongst one another. Such sharing is facilitated by execution of the integration component 118 by the CPU 112. Accordingly, the integration component 118 includes software code that is configured to facilitate communication and interaction between various agents of the plurality of the agents 122. For example, the integration component 118 includes various plug-ins (e.g., software components) that enable communication between the various agents of the plurality of agents 122. Because of the various plug-ins, the integration component 118 is able to apply one or more configuration parameters associated with a source device of the plurality of devices 102 to a target device of the plurality of devices 102.

The data protection component 120 calls the integration component 118 to select an appropriate agent amongst the plurality of agents 122 to access various configuration parameters from a particular device of the plurality of devices 102. Subsequently, the integration component 118 determines an appropriate agent to extract the parameter data 110. Once the parameter data 110 is extracted, the integration component 118 communicates the parameter data 110 to the data protection component 120. The data protection component 120, in turn, stores the parameter data 110 as the device configuration information 126.

The plurality of agents 122 include various device specific agent software components that are configured to access and/or extract the parameter data 110 from the plurality of devices 102 in order to generate the device configuration information 126. Each agent of the plurality of agents 122 may be specific to a particular device of the plurality of the devices 102. In one embodiment, the plurality of agents 122 may be executed by the CPU 112 to access and/or extract the parameter data 110 from each device of the plurality of devices 102. The plurality of agents 122 communicate the device configuration information 126 to the server 104. For example, the plurality of agents 122 may employ various protocols (e.g., a Simple Network Management Protocol (SNMP), a Small Computer System Interface (SCSI), and/or the like) to access the parameter data 110 and/or communicate the device configuration information 126.

In one embodiment, the device configuration information 126 associated with the plurality of devices 102 may include but not limited to a Logical Unit Number (LUN) configuration of an array, a zoning configuration of a switch, a packet filtering policy of a firewall and/or the like. The device configuration information 126 includes various parameters for operating and managing the plurality of devices 102 (e.g., creating a LUN, assigning a LUN to a host computer, assigning an IP address to a NIC, establishing a SCSI target address for a LUN, adding the host computer to a zone and/or the like). The plurality of agents 122 access parameter data 110 that is associated with the plurality of devices 102 as described further below.

In one embodiment, the application configuration information 128 includes various configuration parameters associated with operating one or more applications (e.g., the application 134) on the host computer 106 and the plurality of devices 102. Each application configuration reflects relationships between an instance of an application and one or more computer hardware components (e.g., operating systems, storage services, networking and/or the like). As described further below, the various parameters may enable application recovery using an application configuration that correlates with the related computer hardware components on the host computer 106 and the plurality of devices 102 that are used to operate the application 134 at the host computer 106. For example, the various parameters stored within the application configuration information 128 may represent an instance of the application 134 (e.g., a database application, such as ORACLE Database) as well as any related computer hardware component configurations (e.g., a directory, a volume id, a volume group, Logical Unit Number (LUN) exported by an array and/or the like).

The application agent 124 may be configured to generate the application configuration information 128 and establish appropriate relationships/dependencies between the application 134 and various related computer hardware components within the host computer 106 and/or the plurality of devices 102 (e.g., a Storage Area Network (SAN), Network Interface Cards (NICs), a disk array, a fibre chanel switch and/or the like). The various related computer hardware components may be critical for operating the application 134. The application agent 124 is configured to access information related to data files, index files and volumes that are linked to an LUN or an array. For example, the application agent 124 identifies and configures a destination NIC with an Internet Protocol (IP) address previously used at a source NIC at the host computer 106.

The data protection component 120 cooperates with the integration component 118 to discover the plurality of devices 102 and one or more computer hardware components within the host computer 106. As an example and not as a limitation, the integration component 118 (e.g., VERITAS Enterprise Administrator (VEA)) may utilize various agents (e.g., VERITAS Array Integration Layer (VAIL), SAL, and CommandCentral (CC)) to discover computer hardware components and access configuration parameters. In one embodiment, the data protection component 120 utilizes the application agent 124 to capture the application configuration information 128 associated with the application 134 running on the host computer 106 as well as one or more related computer hardware components.

The data protection component 120 may request the device configuration information 126 through the integration component 118. Hence, the integration component 118 selects an appropriate device agent amongst the plurality of agents 122 to extract the device configuration information 126. For example, the data protection component 120 may utilize an interface (e.g., an Application Programming Interface (API), Command Line Interface (CLI), and/or the like) provided by the integration component 118 to issue such requests. The data protection component 120 stores the device configuration information 126 and/or the application configuration information 128 in the memory 116.

The data protection component 120 (e.g., SYMANTEC NetBackUp (NBU)) performs regular backups of application configurations and device configurations associated with the plurality of devices 102 and/or the host computer 106 in accordance with a user-configured backup policy. Furthermore, the data protection component backs up configurations that are critical to the operations of the application 134, such as configurations associated with application software and/or an operating system. In one embodiment, a backup may be performed at a fixed pre-defined time interval or a variable time interval. In another embodiment, the backup policy identifies one or more devices that are to be backed up. Furthermore, various protocols may be employed to perform the regular backups (e.g., a Simple Network Management Protocol (SNMP), a Small Computer System Interface (SCSI), and/or the like).

The data protection component 120 includes software code that is executed by the CPU 112 to identify one or more compatible configuration parameters between an application configuration that correlates with one or more source computer hardware components (e.g., one or more devices of plurality of devices 102 or the host computer 106) for operating the application 134 and device configurations associated with one or more destination computer hardware components. The source computer hardware components and the destination computer hardware components may include two similar computer hardware components that perform a same function (e.g., two arrays, two switches, two routers, two network cards and/or the like) and have one or more compatible device configuration parameters, such as a LUN size, a host computer name to which a LUN is assigned, a number of LUNs and/or the like for arrays.

In one or more embodiments, the data protection component 120 examines the application configuration information 128 to identify an application to be recovered, such as the application 134. Once an application configuration that correlates with source computer hardware (e.g., one or more related hardware components, such as the plurality of devices 102) for operating the application 134 is selected to be restored (e.g., by a user and/or an administrator), the data protection component 120 maps the application configuration to destination computer hardware associated with the host computer 106 and/or another host computer.

In operation, the data protection component 120 identifies one or more portions (i.e., a subset) of an application configuration to be restored on the destination computer hardware. The data protection component 120 compares the application configuration to a configuration of the destination computer hardware to identify one or more compatible configuration parameters (e.g., a LUN configuration, size of a LUN, virtual disk, a host computer to which a LUN is assigned, zoning of a host, and/or the like).

Figure 2:
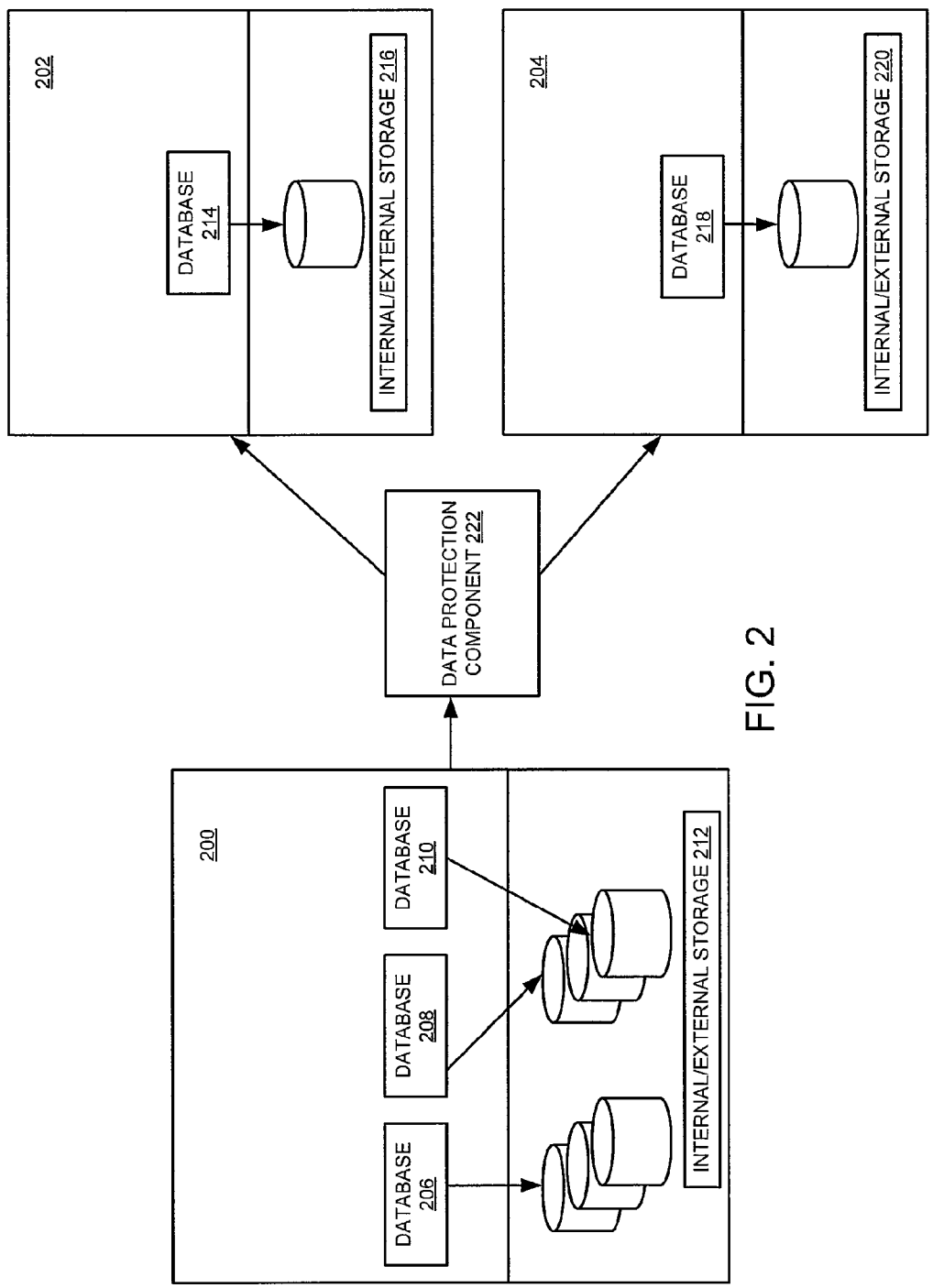
FIG. 2 is a functional diagram that illustrates application instance restoration, according to various embodiments of the present invention.

FIG. 2 is a functional diagram that illustrates application instance restoration from a host 200 to a host 202 and a host 204, according to one embodiment of the invention. Generally, the host 200, the host 202 and the host 204 are host computers (e.g., the host computer 106 of FIG. 1). The host 200 includes various application instances, such as a database 206, a database 208, and a database 210. Notably, the database 206, the database 208 and the database 210 are database application instances (e.g., ORACLE database)).

The database 206, the database 208 and the database 210 operate on source computer hardware within the host 200. For example, the host 200 includes an internal/external storage 212 that provides data storage services to the database 206, the database 208 and the database 210. As described further below, a data protection component 222 (e.g., the data protection component 120 of FIG. 1) restores the database 210 on the host 202 as a database 214 (i.e., a database application instance) that operates on internal/external storage 216. In addition, the data protection component 222 restores the database 206 on the host 204 as a database 218 that operates on internal/external storage 220.

In one embodiment, the data protection component 222 (e.g., NetBackUp-Bare Metal Recovery (NBU-BMR)) backups and maintains point-in-time consistent device configuration parameters associated with the internal/external storage 212, the internal/external storage 216 and the internal/external storage 220. Subsequently, a user and/or administrator may select a database application instance (e.g., the application 134 of FIG. 1) and one or more related Logical Unit Numbers (LUNs) within the internal/external storage 212 for restoration.

In one embodiment, the database 206 and the database 210 are selected to be restored to the host 204 and the host 202 respectively. The data protection component 222 cooperates with an integration component (e.g., the integration component 118 of FIG. 1) to identify information regarding application configurations associated with the database 206 and the database 210 that correlate with the internal/external storage 212. For example, the application configurations may indicate a directory, a volume, a volume group, a hard disk and/or LUNs exported by the internal/external storage 212 and utilized by the database 206 and/or the database 210. As another example, the application configurations may indicate an IP address of a NIC card at the host 200 that is used by the database 206 and/or the database 210 to communicate data. Furthermore, the application configurations may define an operating system, a file system and/or a Fibre-Channel switch configuration associated with the host 200.

The data protection component 222 identifies one or more portions of the application configurations to be restored. The data protection component 222 applies one or more portions of the application configurations to destination computer hardware within the host 202 and the host 204. As a result, the database 206 and the database 210 operate on one or more computer hardware components within the host 204 and the host 202 respectively. For example, the database 206 and the database 210 access and store information in the internal/external storage 220 and the internal/external storage 216 respectively.

In one embodiment, the data protection component 222 identifies one or more compatible configuration parameters (e.g., a LUN configuration, size of a LUN, virtual disk, a host to which a LUN is assigned, zoning of the host, and/or the like) between the application configurations that correlate with the source computer hardware and a device configuration of the destination computer hardware. The one or more compatible configuration parameters may be a subset of the application configurations.

In one embodiment, the data protection component 222 communicates the one or more compatible configuration parameters to one or more agents (e.g., device agents), which apply the one or more compatible configuration parameters to the internal/external storage 216 and the internal/external storage 220. For example, the data protection component 222 configures the internal/external storage 216 with volume IDs and a LUN size that are used at the internal/external storage 212 for the database 210. The database 214 utilizes same volume IDs and LUN size as the database 210. As such, the database 210 is recovered as the database 214.

The host 202 may be a bare metal server that does not include an operating system, application software and/or computer hardware configurations. When the data protection component decides to restore the database 210 on the host 202 as the database 214, the data protection component examines an application configuration to identify an operating system and/or application software to be installed. Because the database 214 may depend upon various software programs to function properly, the data protection component 222 recovers the operating system, device and application software as well as any respective configuration as a portion of the bare metal recovery. Then, the data protection component compares the application configuration with a device configuration associated with the internal/external storage 216. In one embodiment, one or more compatible configuration parameters are identified and applied to the internal/external storage 216 as described above. Therefore, the data protection component provisions the host 202 with the computer hardware configurations as well is the operating system and the application software.

Figure 3:
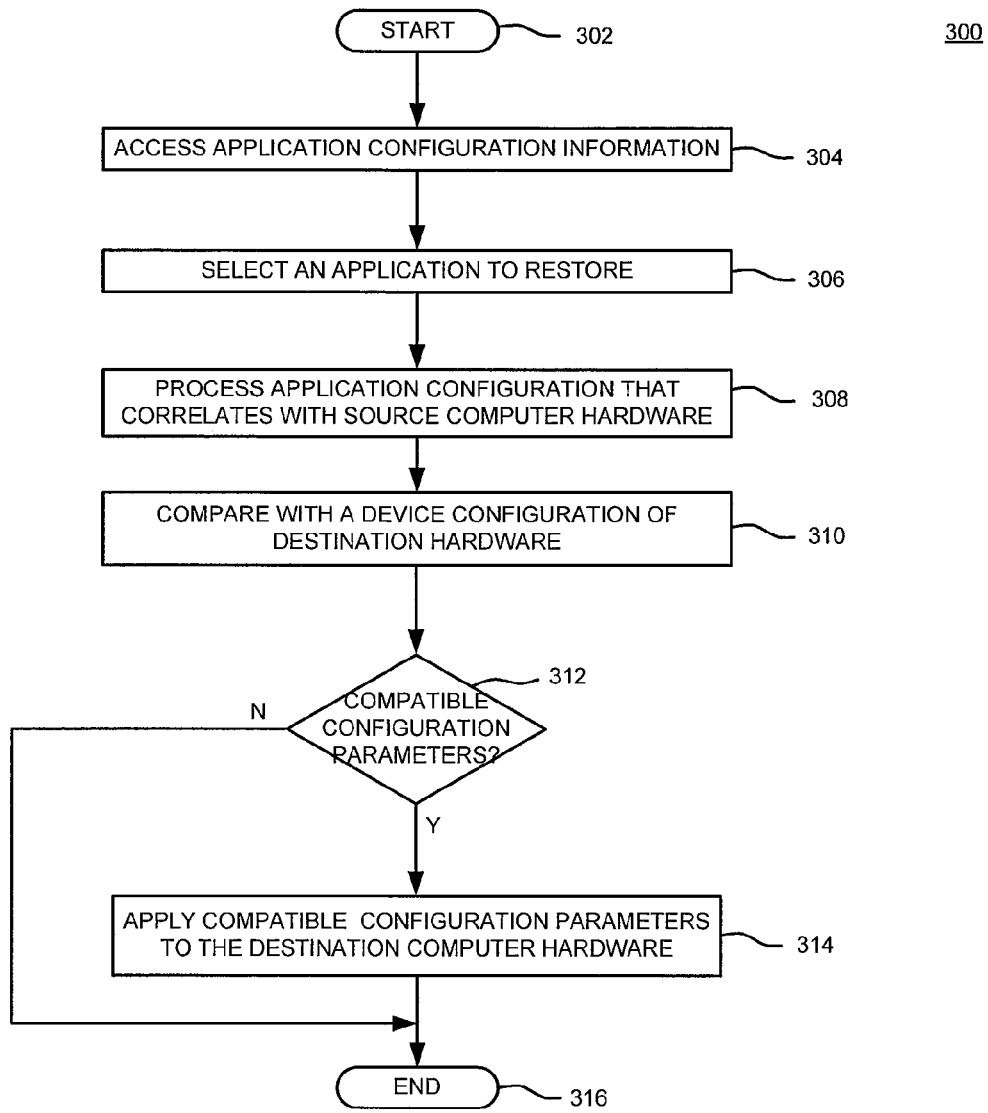
FIG. 3 is a flow diagram of a method for facilitating application recovery using configuration information according to various embodiments of the present invention.

FIG. 3 is a flow diagram of a method 300 for facilitating application recovery using configuration information, according to one embodiment of the invention. The method 300 starts at step 302 and proceeds to step 304, at which application configuration information (e.g., the application configuration information 128 of FIG. 1) is accessed. In one embodiment, a data protection component (e.g., the data protection component 120 of FIG. 1) accesses the application configuration information.

At step 306, an application is selected for restoration. At step 308, an application configuration that correlates with source computer hardware is processed. In one embodiment, the data protection component cooperates with an integration component (i.e., the integration component 128) to select the application (e.g., the application 134) and one or more related computer hardware components that are to be restored. At step 310, the application configuration is compared with a device configuration of destination computer hardware.

At step 312, a determination is made as to whether there are compatible configuration parameters between the source computer hardware and the destination computer hardware. If it is determined that there are no compatible configuration parameters (option "NO") then the method 300 proceeds to step 316. If it is determined that there are compatible configuration parameters (option "YES"), then the method 300 proceeds to step 314. At step 314, one or more compatible configuration parameters are applied to the destination computer hardware. The method 300 proceeds to step 316, at which the method 300 ends.

While the foregoing is directed to embodiments of the present invention, other and further embodiments of the invention may be devised without departing from the basic scope thereof, and the scope thereof is determined by the claims that follow.

The invention claimed is:
1. A method comprising:
 accessing information in memory associated with an application configuration that correlates with source computer hardware for operating an application, using at least one processor, wherein
  the information associated with the application configuration comprises configuration parameters associated with operating the application, and
  the application configuration indicates at least one relationship between the application and the source computer hardware;
 identifying a portion of the application configuration to be restored, using the at least one processor, wherein
  the portion is less than all of the application configuration, and
  restoring the application configuration excludes a second portion of the application configuration from the restoring;
 receiving parameter data from a plurality of device-specific agents, wherein
  each device-specific agent of the plurality of device-specific agents is associated with a respective destination computer of a plurality of destination computers;

comparing the application configuration with a configuration of destination computer hardware, wherein
the destination computer hardware comprises a bare metal server that does not include an operating system or other software applications, and
the configuration of the destination computer hardware is based on the parameter data;
in response to the comparing, determining at least one compatible configuration parameter between the source computer hardware and the destination computer hardware; and
in response to the determining, applying the portion of the application configuration to the destination computer hardware, using the at least one processor.

2. The method of claim 1, wherein the source computer hardware and the destination computer hardware are provided by different vendors.

3. The method of claim 1, wherein the identifying the portion of the application configuration to be restored further comprises:
selecting the application and at least one related device to be restored.

4. The method of claim 1, wherein the applying further comprises:
applying the at least one compatible configuration parameter to the destination computer hardware.

5. The method of claim 1, further comprising:
restoring an instance of the application on the destination computer hardware.

6. The method of claim 1, wherein the accessing the information further comprises:
establishing the at least one relationship between the application and the source computer hardware.

7. The method of claim 1, further comprising:
generating application configuration information for at least one related computer hardware component.

8. The method of claim 1, wherein the at least one compatible configuration parameter is a subset of the configuration parameters.

9. The method of claim 1, wherein the information associated with the application configuration for operating the application on the source computer hardware comprises at least one of:
a directory, a volume, a volume group, a hard disk, and one or more logical unit numbers (LUNs) utilized by a host computer,
an internet protocol (IP) address of a network interface card (NIC) at the host computer, and
an operating system, a file system, and a Fibre-Channel switch configuration associated with the host computer.

10. The method of claim 1, wherein the at least one compatible configuration parameter comprises one of:
a logical unit number (LUN) configuration,
a size of the LUN,
a virtual disk,
a host computer to which the LUN is assigned, and
zoning of the host computer.

11. The method of claim 1, further comprising:
applying a subset of the application configuration to a second destination computer hardware.

12. The method of claim 1, further comprising:
determining a second application, wherein
the second application is critical to operation of the application; and
applying the second application to the destination computer hardware.

13. The method of claim 1, further comprising:
performing periodic backup operations, wherein
the performing the periodic backup operations comprises backing up the application configuration and the parameter data.

14. The method of claim 1, further comprising:
selecting a first device-specific agent of a plurality of device-specific agents, wherein
the first device-specific agent is associated with a first destination computer of the plurality of destination computers, and
the selecting is performed by an integration component configured to facilitate communication between the plurality of device-specific agents;
extracting a first portion of the parameter data from the first destination computer, wherein
the extracting is performed by the first device-specific agent; and
transmitting the first portion of the parameter data to a server.

15. An apparatus comprising:
one or more processors;
memory coupled to the one or more processors, wherein the memory stores program instructions executable by the one or more processors to:
access information in memory associated with an application configuration that correlates with source computer hardware for operating an application, wherein
the information associated with the application configuration comprises configuration parameters associated with operating the application, and
the application configuration indicates at least one relationship between the application and the source computer hardware,
identify a portion of the application configuration to be restored, using the one or more processors, wherein
the portion is less than all of the application configuration, and
restoring the application configuration excludes a second portion of the application configuration from the restoring;
receive parameter data from a plurality of device-specific agents, wherein
each device-specific agent of the plurality of device-specific agents is associated with a respective destination computer of a plurality of destination computers;
compare the application configuration with a configuration of destination computer hardware, wherein
the destination computer hardware comprises a bare metal server that does not include an operating system or other software applications, and
the configuration of the destination computer hardware is based on the parameter data,
in response to the compare, determine at least one compatible configuration parameter between the source computer hardware and the destination computer hardware, and
in response to the determine, apply the portion of the application configuration to the destination computer hardware.

16. The apparatus of claim 15, wherein the program instructions are further executable to:
restore an instance of the application on the destination computer hardware.

17. The apparatus of claim 15, wherein the program instructions are further executable to:

establish the at least one relationship between the application and the source computer hardware.

18. The apparatus of claim 15, wherein the program instructions are further executable to:
generate information for the application and application configuration information for at least one related computer hardware component.

19. A non-transitory computer-readable-storage medium comprising one or more processor-executable instructions that, when executed by at least one processor, causes the at least one processor to:
access information associated with an application configuration that correlates with source computer hardware for operating an application, wherein
the information associated with the application configuration comprises configuration parameters associated with operating the application, and
the application configuration indicates at least one relationship between the application and the source computer hardware;
identify a portion of the application configuration to be restored, wherein
the portion is less than all of the application configuration, and
restoring the application configuration excludes a second portion of the application configuration from the restoring;
receive parameter data from a plurality of device-specific agents, wherein
each device-specific agent of the plurality of device-specific agents is associated with a respective destination computer of a plurality of destination computers;
compare the application configuration with a configuration of destination computer hardware, wherein
the destination computer hardware comprises a bare metal server that does not include an operating system or other software applications, and
the configuration of the destination computer hardware is based on the parameter data;
determine at least one compatible configuration parameter between the source computer hardware and the destination computer hardware, in response to the compare; and
apply the portion of the application configuration to the destination computer hardware, in response to the determine.

20. The non-transitory computer-readable-storage medium of claim 19 further comprising one or more processor-executable instructions that, when executed by the at least processor, causes the at least one processor to:
restore an instance of the application on the destination computer hardware.

21. The non-transitory computer-readable-storage medium of claim 19 further comprising one or more processor-executable instructions that, when executed by the at least processor, causes the at least one processor to:
generate application configuration information for at least one related computer hardware component.

22. The non-transitory computer-readable-storage medium of claim 19 further comprising one or more processor-executable instructions that, when executed by the at least processor, causes the at least one processor to:
establish the at least one relationship between the application and the source computer hardware.

* * * * *